(12) United States Patent
Barbarossa

(10) Patent No.: US 11,177,900 B2
(45) Date of Patent: Nov. 16, 2021

(54) INTEGRATED WDM OPTICAL TRANSCEIVER

(71) Applicant: II-VI Delaware, Inc., Wilmington, DE (US)

(72) Inventor: Giovanni Barbarossa, Saratoga, CA (US)

(73) Assignee: II-VI Delaware, Inc., Wilmington, DE (US)

( * ) Notice: Subject to any disclaimer, the term of this patent is extended or adjusted under 35 U.S.C. 154(b) by 0 days.

(21) Appl. No.: 16/611,598

(22) PCT Filed: Jun. 7, 2018

(86) PCT No.: PCT/US2018/036536
§ 371 (c)(1),
(2) Date: Nov. 7, 2019

(87) PCT Pub. No.: WO2018/227005
PCT Pub. Date: Dec. 13, 2018

(65) Prior Publication Data
US 2020/0162184 A1    May 21, 2020

Related U.S. Application Data

(60) Provisional application No. 62/516,349, filed on Jun. 7, 2017.

(51) Int. Cl.
*H04J 14/02* (2006.01)
*G02B 6/12* (2006.01)
(Continued)

(52) U.S. Cl.
CPC .......... *H04J 14/0209* (2013.01); *G02B 6/124* (2013.01); *G02B 6/12009* (2013.01);
(Continued)

(58) Field of Classification Search
CPC .............. H04J 14/0209; H04J 14/0256; G02B 6/12021; G02B 6/12019; G02B 6/12009;
(Continued)

(56) References Cited

U.S. PATENT DOCUMENTS 5,568,574 A * 10/1996 Tanguay, Jr. .............. G02B 5/32
359/15
7,103,277 B2 * 9/2006 Ridgway ............ G02B 6/12019
385/24

(Continued)

FOREIGN PATENT DOCUMENTS

GB          2239323    *  6/1991    ......... H04Q 11/0062
WO   WO-2017027042 A1 *  2/2017    ......... H04Q 11/0005

*Primary Examiner* — Leslie C Pascal
(74) *Attorney, Agent, or Firm* — Wendy W. Koba

(57) ABSTRACT

An integrated wavelength division multiplexing (WDM) optical transceiver comprises the following elements: (1) a light source; (2) an array of photodiodes responsive to a plurality of optical signals and forming a plurality of electrical received information signals therefrom; and (3) a photonics integrated module (PIM) including transmission components and receiving components necessary to provide transceiver functionality. The transmission components include a demultiplexer, an electro-optic modulator array, and a multiplexer for combining a plurality of modulated optical signals onto a single output signal path as the transceiver output. The receiving components include a demultiplexer responsive to an incoming WDM signal for separating each wavelength component and creating a plurality of received optical signals.

14 Claims, 6 Drawing Sheets

(51) Int. Cl.
  *G02B 6/122* (2006.01)
  *G02B 6/124* (2006.01)
  *H04B 10/40* (2013.01)
  *H04B 10/50* (2013.01)
  *H01S 3/067* (2006.01)

(52) U.S. Cl.
  CPC ...... *G02B 6/12011* (2013.01); *G02B 6/12019* (2013.01); *G02B 6/12021* (2013.01); *G02B 6/1225* (2013.01); *H01S 3/06754* (2013.01); *H04B 10/40* (2013.01); *H04B 10/506* (2013.01)

(58) Field of Classification Search
  CPC .. G02B 6/12011; G02B 6/1225; G02B 6/124; H04B 10/506; H04B 10/40; H01S 3/06754
  See application file for complete search history.

(56) References Cited

U.S. PATENT DOCUMENTS

| | | | |
|---|---|---|---|
| 7,127,168 B2* | 10/2006 | Kani | H04B 10/506 398/79 |
| 2008/0128618 A1* | 6/2008 | Rahman | G02F 1/353 250/332 |
| 2010/0046950 A1* | 2/2010 | Cao | H04B 10/506 398/79 |
| 2013/0089333 A1* | 4/2013 | Shen | H04B 10/506 398/79 |
| 2013/0287407 A1* | 10/2013 | Pan | H04B 10/40 398/139 |
| 2013/0322809 A1* | 12/2013 | Goh | H04B 10/5053 385/3 |
| 2014/0328591 A1* | 11/2014 | Koch | H04B 10/503 398/49 |
| 2017/0153391 A1* | 6/2017 | Verslegers | G02B 6/30 |
| 2017/0194310 A1* | 7/2017 | Evans | H01L 25/18 |
| 2019/0190639 A1* | 6/2019 | Chaffee | H04B 10/506 |

* cited by examiner

… (1)

INTEGRATED WDM OPTICAL TRANSCEIVER

CROSS-REFERENCE TO RELATED APPLICATIONS

This application claims the benefit of U.S. Provisional Application No. 62/516,349, filed Jun. 7, 2017 and herein incorporated by reference.

TECHNICAL FIELD

The present invention relates to an optical transceiver and, more particularly, to a wavelength division multiplexing (WDM) optical transceiver that is relatively compact in form and requiring a minimal number of separate components.

BACKGROUND OF THE INVENTION

Many of today's optical communication systems are based upon the use of WDM, where multiple information signals are carried by separate wavelengths along the same communication medium (such as an optical fiber). WDM communication allows for an increase in the number of separate information signals that can be transmitted (and received) along a given signal path. In a WDM transceiver, lasers operating at different wavelengths are separately modulated by unique electrical data signals and create a plurality of optical information signals that are then multiplexed together and transmitted along a common output signal path.

In order to transmit all of these separate modulated optical signals along a single optical waveguide (fiber), the separate modulated optical signals are typically applied as inputs to an optical wavelength division multiplexer, which functions to combine all of the signals for transmission along a common optical output signal path. In one or more embodiments, the optical wavelength division multiplexer may take the form of a guided wave structure (e.g., an arrayed waveguide grating (AWG) structure), a passive device that enables the various optical wavelengths to be multiplexed in a controlled manner.

At least one problem with the typical prior art configuration is the need for multiple discrete components, including separate laser sources for each wavelength associated with the system. In particular, each separate laser source needs to be separately aligned with an optical waveguide input to its associated modulator. This alignment needs to be maintained over the life of the transceiver, which may be problematic as a result of aging changes, changes in environmental conditions, and the like. Moreover, the operating wavelength of each laser needs to be individually (and continuously) controlled to remain within a selected spectrum for that "channel" of the WDM system. The use of separate laser sources also requires a relatively large-sized package in order to house all of the various components. Optical communication equipment continues to be constrained to use a relatively small package "footprint", making the need for separate laser modules problematic.

One solution to this problem is to utilize an integrated array of laser diodes fabricated as a single chip in place of discrete laser devices. The use of an array of laser diodes, each operating at a different wavelength, may be a solution to reduce the number of alignments. However, such an array typically has a higher cost than the sum of the costs for individual laser diodes (related to the inherently low yield of laser array chips). In fact, the entire laser array chip would need to be scrapped if only one laser fails to work. Additionally, the fabrication of multi-wavelength laser array chips is more complex, and therefore has a higher cost, than the fabrication of a laser array of devices all emitting at the same wavelength. In light of all these shortcomings, a laser array option is typically not a viable solution for systems utilizing four or more wavelengths.

SUMMARY OF THE INVENTION

The needs remaining in the prior art are addressed by the present invention, which relates to an optical transceiver and, more particularly, to a wavelength division multiplexed (WDM) optical transceiver that is relatively compact in form and requiring a minimal number of separate components.

In accordance with one or more embodiments, the present invention takes the form of an integrated wavelength division multiplexing (WDM) optical transceiver comprising the following elements: (1) a light source; (2) an array of photodiodes responsive to a plurality of optical signals and forming a plurality of electrical received information signals therefrom; and (3) a photonics integrated circuit module (PIM) including both transmission-related optical and electro-optic components, and receiving-related optical components. The PIM may be embodied in any suitable semiconductor material system, including but not limited to silicon-based modules, InP-based modules, and GaAs-based modules. The transmission components include a wavelength division demultiplexer for spectrally slicing the incoming light beam into a set of separate optical wavelength components, an electro-optic modulator array coupled to the set of separate optical wavelength components and responsive to a set of input electrical information signals to generate a plurality of modulated optical signals, and a wavelength division multiplexer for combining the plurality of modulator optical signals onto a single output signal path as the multiplexed optical signal transmitted as the transceiver output. The receiving optical components include a wavelength division demultiplexer responsive to an incoming WDM signal for separating each wavelength component within the incoming WDM signal and creating a plurality of received optical signals, which is thereafter applied as an input to the array of photodiodes to be converted into a set of received electrical information signals.

Other and further aspects and embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
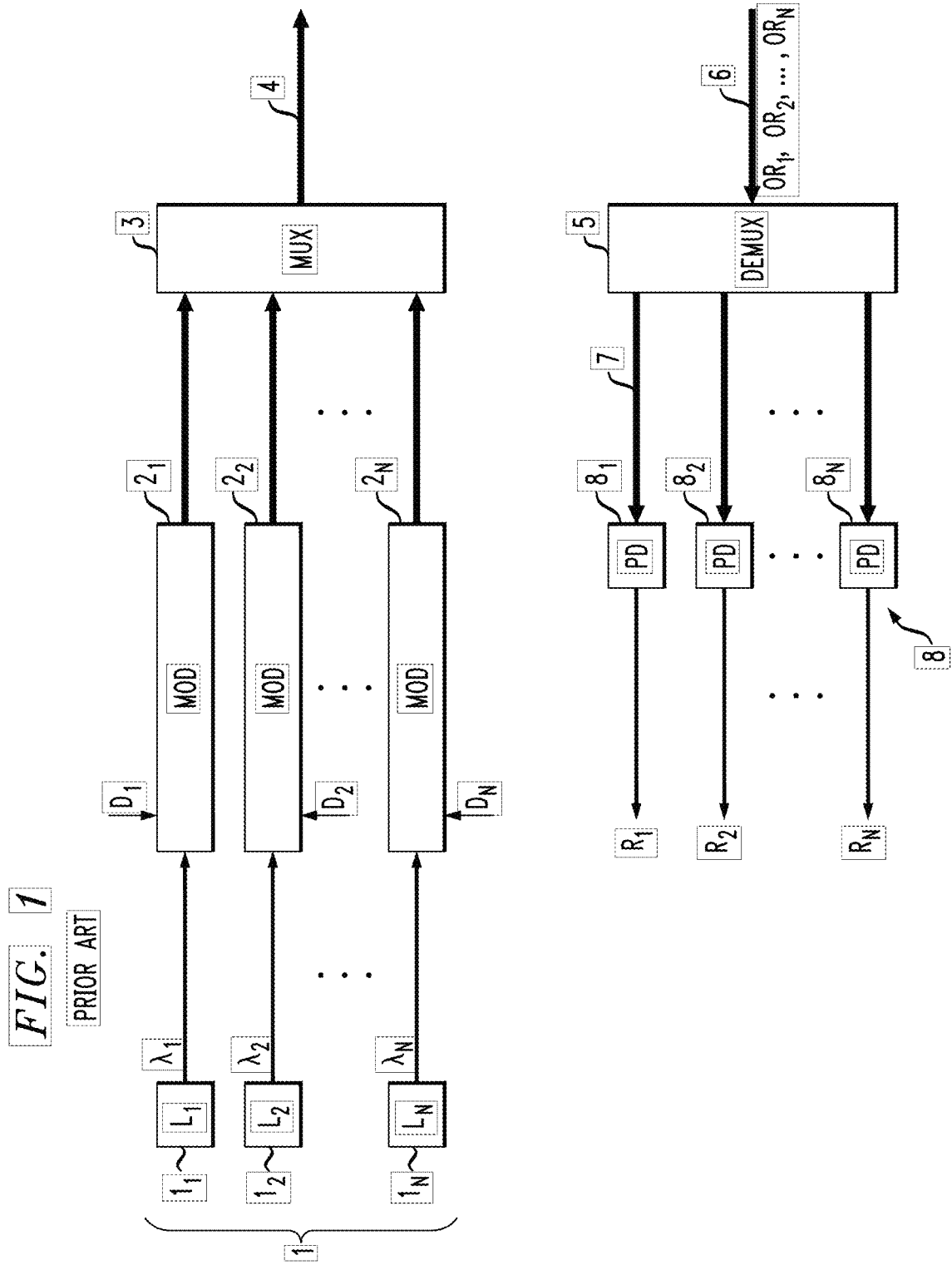
FIG. 1 is a diagram of a prior art WDM optical transceiver.

FIG. 1 illustrates a typical prior art transceiver configuration utilized for WDM optical communication. In this arrangement, a plurality of N separate laser sources 1 are used to provide the plurality of N separate wavelengths used to support the communication of N different data signals. That is, each separate laser source $1_1, 1_2, \ldots, 1_N$ is particularly configured to operate at a different wavelength $\lambda_1, \lambda_2, \ldots, \lambda_N$. Each separate light beam is applied as the optical input to an associated electro-optic modulator $2_1, 2_2, \ldots, 2_N$. Electrical signals carrying the information (data) to be transmitted (shown as $D_1, D_2, \ldots, D_N$ in FIG. 1) are applied to the proper optical modulator $2_i$ and used to create a modulated optical output signal (at the respective wavelength) as is well-known in the art. The group of modulated optical signals are then passed through a wavelength division multiplexer configuration 3 and coupled into a common output optical signal path 4 (such as an optical fiber or optical waveguide).

The receiving portion of the prior art transceiver consists of an optical wavelength division demultiplexer 5, which is shown as coupled to a single incoming optical signal path 6. The received incoming signal along path 6 comprises a plurality of optical received signals $OR_1, OR_2, \ldots, R_N$ (each operating at a different wavelength). Optical wavelength division demultiplexer 5 functions to direct each wavelength along a separate output signal path 7, with each path coupled to a separate optoelectronic receiving device (i.e., separate photodiodes $8_1$-$8_N$) to convert the set of optical signals into electrical equivalents shown as $R_1, R_2, \ldots, R_N$.

While the arrangement as shown in FIG. 1 functions in an acceptable manner as a WDM transceiver, the number of separate components, as well as separate alignments between components, leads to a configuration that is relatively large in size and expensive to manufacture.

Figure 2:
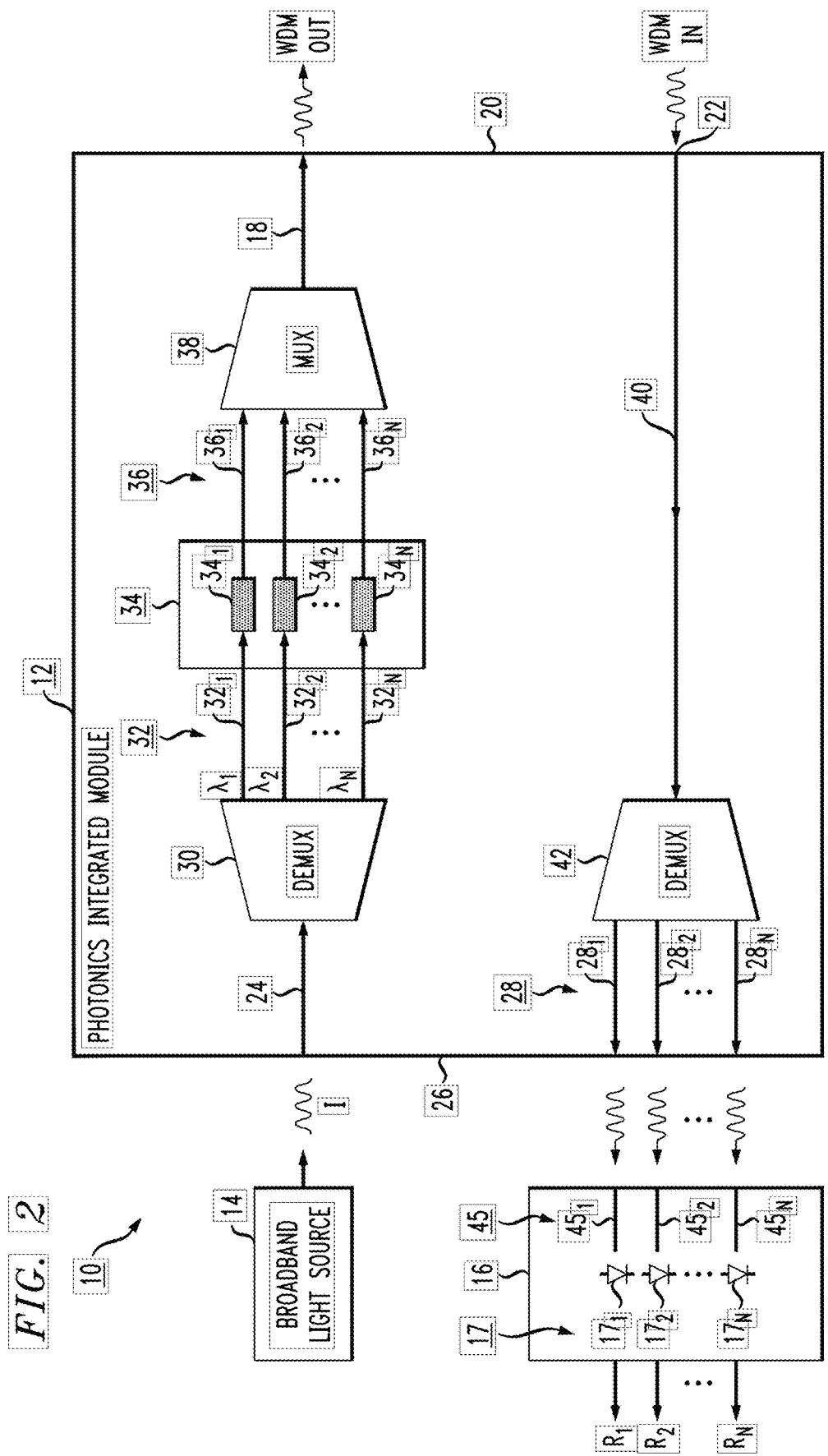
FIG. 2 is a high level diagram of an integrated WDM optical transceiver utilizing a photonics integrated module in accordance with the present invention.

FIG. 2 illustrates an exemplary integrated WDM optical transceiver 10 formed in accordance with one or more embodiments of the present invention. As will be described below, the "integrated" formation of optical transceiver 10 includes a first integrated chip 12 (formed as a semiconductor photonics integrated circuit module (PIM)) that includes the complete set of active and passive optical components used for wavelength division optical communication, a second integrated chip 14 that includes a broadband light source used by PIM 12 to create a set of wavelengths for transmission, and a third integrated chip 16 that includes an array of photodetectors for recovering incoming (received) signals. While various prior art optical transceiver configuration may utilize one or more of the individual components found on these three integrated chips, there is no known arrangement where the necessary functionalities have been integrated into the form shown in FIG. 2.

PIM 12 includes, as described in detail below, a wavelength division multiplexer and a pair of wavelength division demultiplexers that are used in combination with an array of electro-optic modulators to: (1) generate a WDM optical output signal from the "transmitter" portion of transceiver 10; and (2) demultiplex a received WDM signal in the "receiver" portion of transceiver 10 into its several wavelength components. The transmitter portion of PIM 12 is shown as including a wavelength division demultiplexer 30, an electro-optic modulator array 34, and a wavelength division multiplexer 38, arranged as shown. The receiver portion of PIM 12 is shown as including a wavelength division demultiplexer 42. The details of these various elements are described below, following this initial description of the elements of integrated WDM transceiver 10. Further, it is to be understood that PIM 12 may be formed of any appropriate semiconductor material system including, but not limited to, silicon, InP, or GaAs.

As shown in FIG. 2, for this particular embodiment of the present invention, the optical output ("WDM OUT") and input ("WDM IN") paths of integrated WDM transceiver 10 are disposed along a common module interface, shown as a first common interface 20 of PIM 12. More particularly, an output optical signal path 18 carrying WDM OUT is shown as exiting along first common interface 20, and an input optical signal path 22 (supporting the propagating of WDM IN) is shown as coupled into PIM 12 along first common interface 20. Still referring to FIG. 2, broadband light source 14 is used to provide a broadband optical input signal I (comprising multiple wavelengths) that is coupled into an optical waveguide 24 disposed within PIM 12 along a second common interface 26. Also present along second common interface 26 is a plurality of integrated waveguides 28, used as described below to support the propagation of demultiplexed, received optical signals. This set of demultiplexed optical signals is thereafter applied as separate inputs to third chip 16 (which is formed to include a plurality of photodiodes 17, or other photo-detecting elements).

As will be described below in association with the discussion of FIGS. 6 and 7, a broadband optical input signal I is created to comprise a plurality of separate wavelengths $\lambda_1, \lambda_2, \ldots, \lambda_N$, where each wavelength is used to support the propagation of a separate data signal. As shown in FIG. 2, this broadband optical input signal I is created by BLS 14 and applied as an input to a first wavelength division demultiplexer 30 integrated within PIM 12. In particular, first demultiplexer 30 may take the form of a guided-wave configuration (e.g., an AWG component, discussed below in association with FIG. 3) or a free-space configuration (e.g., a blazed grating, discussed below in association with FIG. 4). Regardless of the particular configuration, first wavelength division demultiplexer 30 functions to spatially separate the various wavelength components of the broadband input beam, launching each wavelength component onto its own separate optical (integrated) waveguide, shown as optical waveguides $32_1$-$32_N$ in FIG. 2.

In accordance with the principles of the present invention, this set of optical inputs is then coupled into a monolithic integrated electro-optic modulator array 34, formed to include a plurality of separate electro-optic modulators $34_1$-$34_N$, with each different optical wavelength beam applied as an input to a separate modulator. In an exemplary embodiment, electro-optic modulator array 34 is formed as a monolithic module (including waveguides, electrodes, coupling arrangements, etc.) which is thereafter mounted on and coupled to the integrated waveguides formed within PIM 12 (for example, flip-chip attached to PIM 12). An exemplary electro-optic modulator array 34 is discussed below in association with FIG. 5. Also shown in FIG. 2 is a set of separate electrical information signals $D_1$-$D_N$ that are applied as inputs to monolithic electro-optic modulator 34. The data signals are used to modulate the light beams of different wavelengths, creating a plurality of modulated optical signals as the outputs of the separate modulators $34_1$-$34_N$. No active alignment is required to couple the set of optical inputs into the electro-optic modulators.

Continuing with the description of the functionality integrated within PIM 12, the plurality of modulated optical signals created by monolithic electro-optic modulator 34 is then coupled into separate optical waveguides $36_1$-$36_N$ formed within PIM 12, with these modulated signals thereafter applied as separate inputs to an optical wavelength division multiplexer 38. Multiplexer 38 functions to combine (that is "wavelength division multiplex") the set of signals operating at different wavelengths onto output signal path 18 as the transmitted WDM optical output signal created by optical WDM transceiver 10. As mentioned above and described in detail below, the demultiplexers, multiplexer and modulator may all be formed as part of a PIM, providing the necessary functionality in a relatively small and compact arrangement. By virtue of forming PIM 12 of an appropriate material system (e.g., silicon, InP or GaAs), these devices and waveguides may be integrated into such a compact arrangement.

In reviewing the components integrated within the "receive" portion of PIM 12, FIG. 2 illustrates an incoming signal path 22 (which may be fiber, waveguide, free space, or the like) coupled to an integrated waveguide 40 formed as part of PIM 12, with waveguide 40 thereafter applied as an input to a second wavelength division demultiplexer 42 formed within PIM 12. As with first demultiplexer 30, second demultiplexer 42 functions to separate out the distinct wavelength components within the optical received signal, providing each wavelength component along a separate output integrated waveguide $28_1$-$28_N$, as described above and shown FIG. 2. Each integrated waveguide 28 is thereafter directed into third integrated chip 16, as shown above in the system diagram of FIG. 2.

Figure 3:
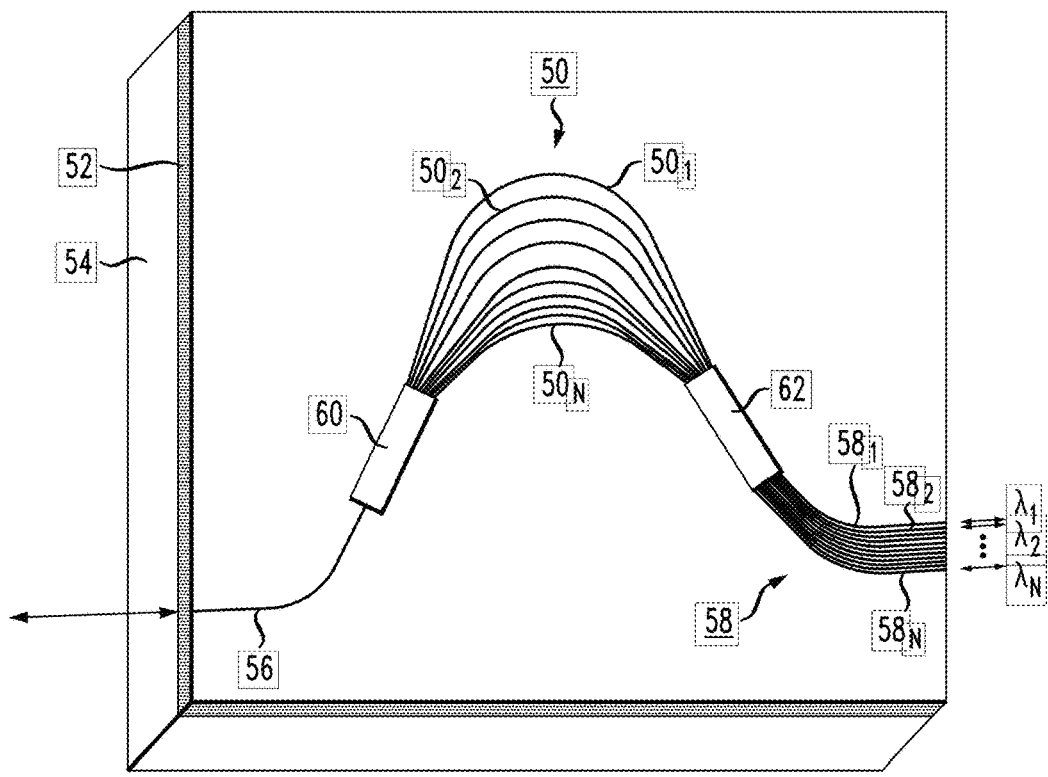
FIG. 3 illustrates an exemplary arrayed waveguide grating (AWG) useful as a guided-wave version of either a wavelength division multiplexer or a wavelength division demultiplexer in the integrated WDM transceiver of the present invention.

As mentioned above, the wavelength division demultiplexers and multiplexer utilized within PIM 12 may be formed as, for example, a "guided-wave" device or a "free-space" device. FIG. 3 illustrates an exemplary guided wave device, in particular an arrayed waveguide grating (AWG) device, that may be used as either a multiplexer or demultiplexer in accordance with the present invention. For the sake of explanation, the AWG of FIG. 3 is described in its demultiplexer functionality. As is well-known in the art, an arrayed waveguide grating is an integrated device that comprises an array of separate integrated waveguides $50_1$-$50_N$ formed within a top surface 52 of optoelectronic material slab 54 (which in this case may comprise the surface of PIM 12). Also formed within top surface 52 is an input waveguide 56 and a plurality of output waveguides 58. Input waveguide 56 supports the propagation of the broadband optical input I (created within second integrated chip 14, see FIG. 2). Input waveguide 56 terminates at a first free space region 60 that allows the different wavelengths to propagate at different velocities, each thereafter being coupled into a separate waveguide of array 50. Each waveguide is formed to comprise a different length and thus provides a different phase shift to the propagating signals. The plurality of output signals from array 50 then pass through a second free space region 62 which functions to separate out the individual wavelength components in a known manner, with each wavelength then launched into its associated integrated output waveguide 58.

As mentioned above, an AWG is a passive optical device that functions in reciprocal form as a multiplexer. That is, a plurality of different signals operating at different wavelengths may be applied as inputs to waveguides 58 and pass through the free space regions and waveguide array in the opposite direction, which functions to then combine all of the different wavelength components onto waveguide 56, and provide as an output a multiplexed optical signal (such as for multiplexer 38 as shown in FIG. 2).

Figure 4:
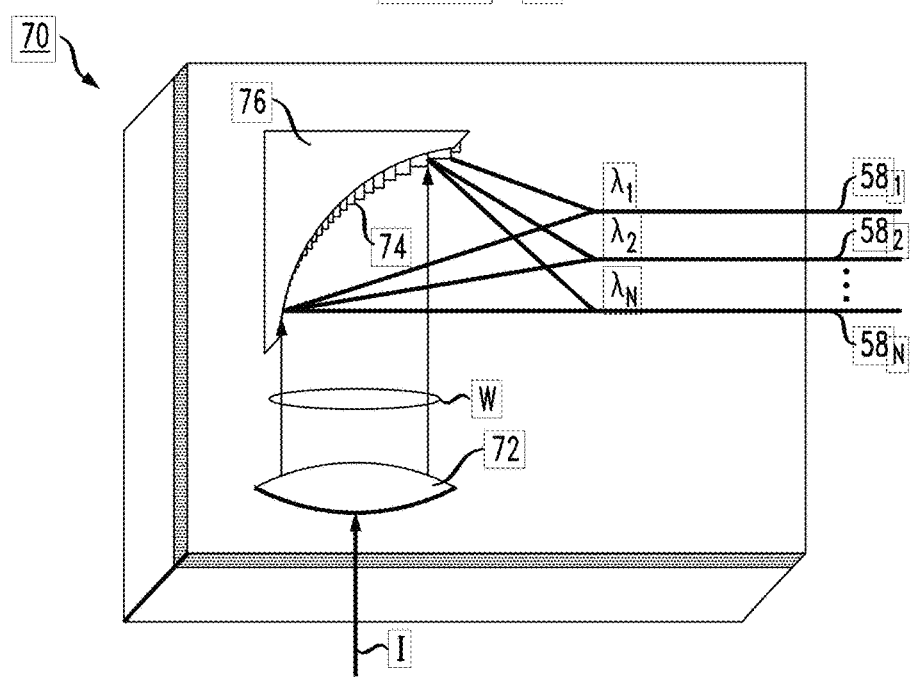
FIG. 4 illustrates an exemplary blazed grating device useful as a free-space version of either a wavelength division multiplexer or a wavelength division demultiplexer in the integrated WDM transceiver of the present invention.

Instead of the guided wave configuration of FIG. 3, a free space multiplexer/demultiplexer may be used within PIM 12 of integrated WDM transceiver 10. FIG. 4 illustrates one such exemplary free space configuration 70, in this case providing a free space optical input signal (from BLS 14) to create the plurality separate optical wavelength signals. As shown, configuration 70 includes a collimating lens 72 that interacts within the incoming broadband beam to create a collimated wavefront W. Wavefront W next impinges a blazed grating structure 74, which is formed in this example along a curved inner surface of a turning mirror 76. As is known in the art, the blazed configuration of the serrations forming grating 74 interact differently with the various wavelengths within a broadband signal, separating the wavelengths in the manner shown to provide the output signals at the various wavelengths, which are thereafter coupled into waveguides 58, in the same manner as described above.

Figure 5:
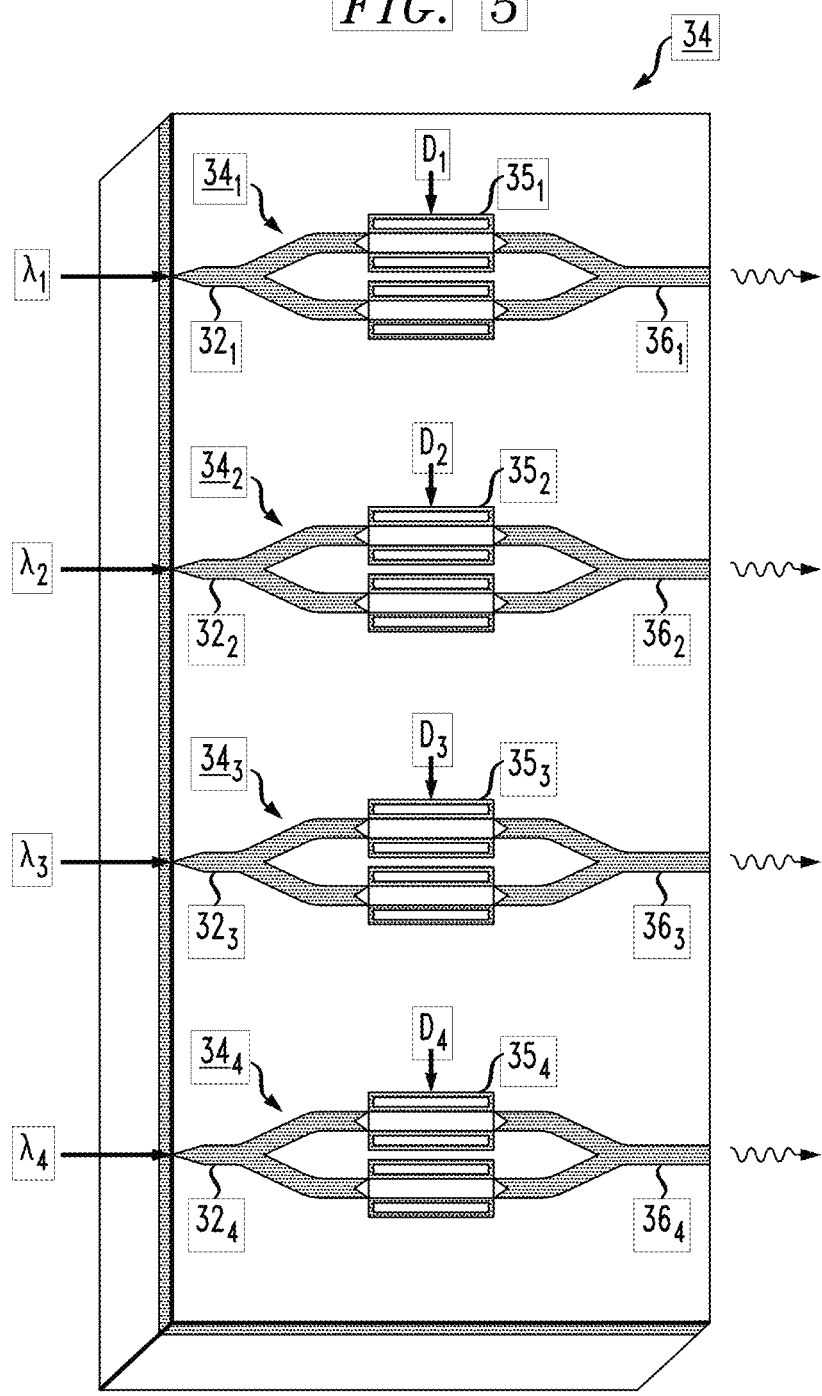
FIG. 5 depicts an exemplary monolithic electro-optic modulator array that may be attached to and defined as part of the photonics integrated module portion of the present invention.

FIG. 5 illustrates a portion of an exemplary integrated electro-optic modulator array that may be incorporated as part of PIM 12 as described above. In particular, modulators may be formed as a single, monolithic integrated circuit device that is thereafter flip-chip mounted onto the top surface of PIM 12. As shown in FIG. 5 (and also with reference to FIG. 2), an exemplary input waveguide $32_i$ is provided as the optical input into modulator 34$i$, with an electrical data signal $D_i$ applied to electrodes 35 formed as port of the modulator structure. The presence of the electrical signal functions in a known manner to create a modulated optical signal as the output of modulator $34_i$. The modulated signal exiting modulator $34_i$ is then coupled into its associated output waveguide $36_i$.

Summarizing, "first chip 12" (i.e., PIM 12) is formed in accordance with the present invention to provide all of the necessary functionality of a WDM optical transceiver, including the formation of a plurality of N modulated optical signals to be multiplexed onto a single output signal path and the reception of an optical signal to be demultiplexed into N separate received signals. The ability to integrate all of the components required for both transmission and reception onto a single photonics integrated module provides important benefits in terms of self-aligned components and a small size as necessary for small form factor applications.

In accordance with one or more embodiments of the present invention, it is proposed to utilize a broadband light source (BLS) to provide a multi-wavelength (incoherent) light beam which is applied as an input to PIM 12 for use by wavelength division demultiplexer 30 to create the plurality of separate wavelengths for use in the transmission portion of the inventive WDM optical transceiver. The use of a BLS instead of multiple discrete laser devices (or an integrated multi-diode laser array) allows for a compact, integrated transceiver to be formed at a cost, performance and configuration acceptable for most "small footprint" system requirements. It is to be understood that the implementation of a broadband laser source is only one exemplary configuration. Other light sources include, for example, laser comb sources that generate a plurality ("comb") frequency components may be used as a laser source in accordance with the principles of the present invention.

Figure 6:
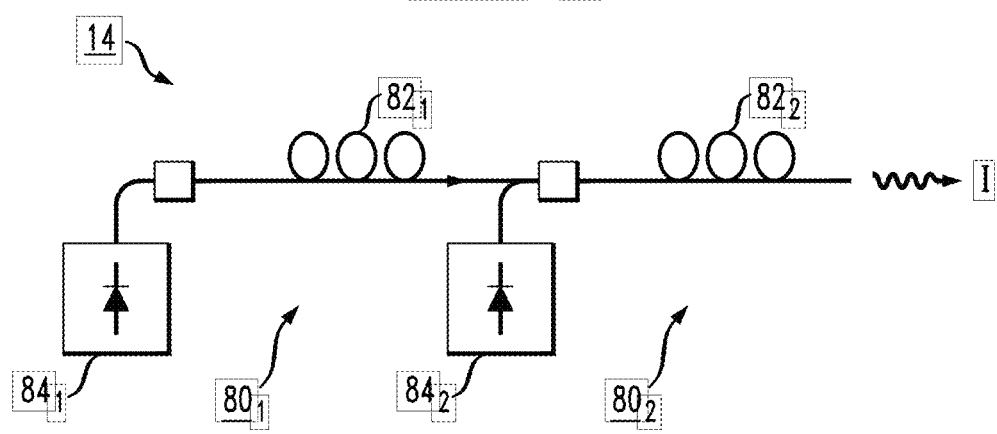
FIG. 6 is a diagram of an exemplary broadband light source which may be used as part of the integrated WDM optical transceiver.

FIG. 6 illustrates one exemplary BLS source 14 that may be used as part of integrated WDM transceiver 10. In this particular embodiment, BLS source 14 is an incoherent, wideband device that emits light across a broad spectrum. Various arrangements may be used to provide an incoherent broadband light beam, where uncooled light emitting diodes (LEDs) have been used for this purpose. Other configurations for creating this type of light beam include configurations of erbium-doped fiber amplifiers (EDFAs), which are capable providing broadband amplified spontaneous emission (ASE) when no input information signal is present (i.e., when only a pump laser source is passed through a section of erbium-doped fiber). FIG. 6 illustrates a pair of EDFAs $80_1$ and $80_2$ disposed in series to form exemplary BLS source 14. Each EDFA is shown as including a section of erbium-doped fiber 82 and laser pump source 84. Amplified spontaneous emission (ASE) noise generation and gain occurs along both sections of erbium-doped fiber $82_1$ and $82_2$. The use of cascaded amplifiers has been found to provide a relatively flat ASE output spectrum, as shown in FIG. 7.

Figure 7:
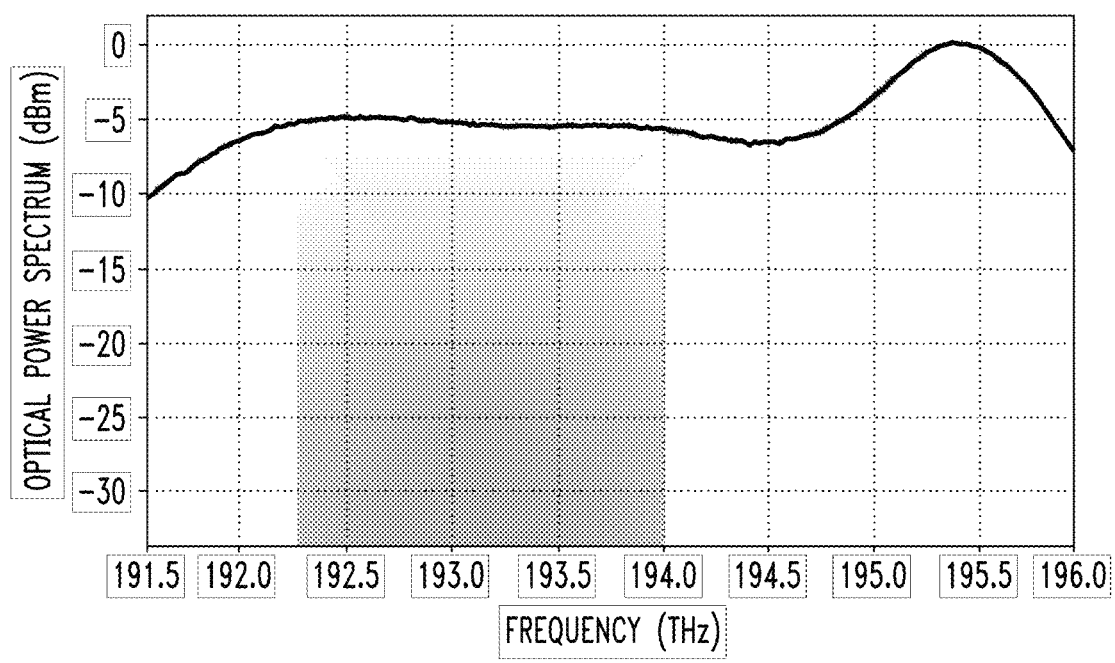
FIG. 7 is a graph of the ASE spectrum generated by the configuration of FIG. 6.

Inasmuch as the optical spectrum shown in FIG. 7 is relatively flat over a given frequency range (shown as the shaded region in FIG. 7), a number of separate bands can be used to provide separate channels in the proposed WDM system, with each channel exhibiting similar optical power levels. For use in this system, the spectrum associated with BLS 70 is "sliced" into N separate, equally spaced wavelength channels by AWG 30 within PIM 12. In particular, first wavelength division demultiplexer 30 is used to perform the spectral slicing, separating the broadband light beam into separate wavelength channels, depicted as $\lambda_1$, $\lambda_2$, ..., $\lambda_N$ (see FIGS. 4 and 5, for example).

It is to be understood that the use of EDFAs as BLS 14 is exemplary only and various other configurations may be used for this purpose, including the creation of an optical supercontinuum from highly nonlinear optical fiber (HNLF). Moreover, other laser sources (such as laser comb sources) may be used to provide the input multiwavelength light beam used for WDM communication. Advantageously, the use of the combination of BLS 14 and first demultiplexer 30 provides a compact arrangement that is able to provide a multiple number of separate wavelength channels, with the use of an integrated grating demultiplexer also maintaining the desired separation between adjacent wavelength channels, while requiring only a single, initial alignment of BLS 14 to first demultiplexer 30.

Referring back to FIG. 2, third integrated chip 16 is formed as the receiver portion of WDM transceiver 10. The demultiplexed optical signals exiting second wavelength division demultiplexer 42 are subsequently applied as separate inputs along a plurality of waveguides 28 (which exit PIM 12 along second common interface 26). This set of received signals is then subsequently coupled into a set of optical waveguides 45 formed within third integrated chip and subsequently applied as inputs to a plurality of opto-electronic devices 17 (e.g., photodiodes) formed within third integrated chip 16 (see FIG. 2). Photodiodes 17 convert the received optical signals into electrical equivalents, which are then provided as received/recovered electrical information signals $R_1, R_2, R_3, \ldots, R_N$ along electrical signal paths (conductors) 48.

Figure 8:
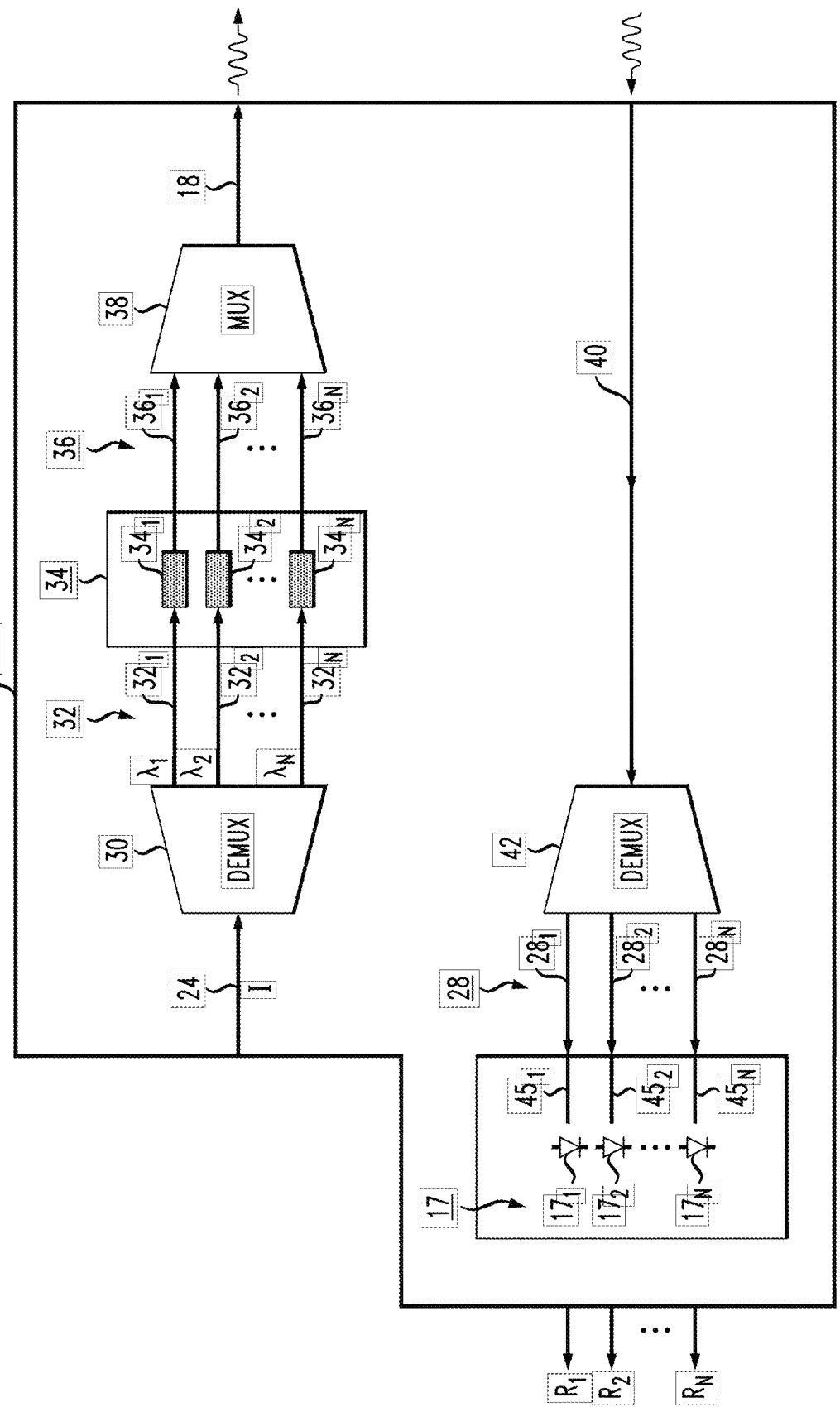
FIG. 8 is a detailed illustration of an alternative embodiment of a photonics integrated module of the inventive integrated WDM optical transceiver.

FIG. 8 illustrates an alternative embodiment of an integrated WDM transceiver formed in accordance with the present invention. Here, an additional level of integration is achieved by incorporating the functionality of third chip 16 within PIM 12, illustrated in FIG. 8 as PIM 12A.

By virtue of combining a receiver demultiplexer and a transmitter multiplexer, as well as the incorporation of the plurality of modulators (and, in some cases the receiver photodiodes), the various embodiments of the present invention provide a level of integration that enables optical WDM transceivers to comply with small form factor requirements at a cost and complexity that is acceptable to users.

The embodiments of the invention described above are intended to be illustrative only. The scope of the invention is therefore intended to be limited solely by the scope of the claims appended hereto.

What is claimed is:

1. An integrated wavelength division multiplexing (WDM) optical transceiver comprising
    a broadband light source formed on a first integrated chip for providing an input multiwavelength light beam;
    an array of photodiodes formed on a second integrated chip and responsive to a plurality of optical signals and forming a plurality of electrical received information signals therefrom; and
    a photonics integrated module (PIM) formed on a third integrated chip and including transmission components and receiving components,
        the transmission components including
            a wavelength division demultiplexer for spectrally separating the input multiwavelength light beam from the broadband light source into a set of spatially separate optical wavelength components;
            an electro-optic modulator array coupled to the set of spatially separate optical wavelength components and responsive to a plurality of electrical information signals to generate a plurality of modulated optical signals; and
            a wavelength division multiplexer for combining the plurality of modulator optical signals onto a single output signal path; and
        the receiving components including
            a wavelength division demultiplexer responsive to an incoming WDM signal for separating each wavelength component within the incoming WDM signal and creating the plurality of optical signals exiting from the third integrated chip and thereafter applied as an input to the array of photodiodes formed on the second integrated chip.

2. The integrated WDM optical transceiver of claim 1 wherein at least one wavelength division demultiplexer comprises a guided wave demultiplexer.

3. The integrated WDM optical transceiver of claim 2 wherein the guided wave demultiplexer comprises an arrayed waveguide grating (AWG) device.

4. The integrated WDM optical transceiver of claim 1 wherein at least one wavelength division demultiplexer comprises a free space demultiplexer.

5. The integrated WDM optical transceiver of claim 4 wherein the free space demultiplexer comprises a blazed grating demultiplexer.

6. The integrated WDM optical transceiver of claim 1 wherein the wavelength division multiplexer comprises a guided wave multiplexer.

7. The integrated WDM optical transceiver of claim 6 wherein the guided wave multiplexer comprises an AWG multiplexer.

8. The integrated WDM optical transceiver of claim 1 wherein the wavelength division multiplexer comprises a free space multiplexer.

9. The integrated WDM optical transceiver of claim 8 wherein the free space multiplexer comprises a blazed grating multiplexer.

10. The integrated WDM optical transceiver of claim 1 wherein each wavelength division demultiplexer and the wavelength division multiplexer all comprise guided wave devices.

11. The integrated WDM optical transceiver of claim 1 wherein each wavelength division demultiplexer and the wavelength division multiplexer all comprise free space devices.

12. The integrated WDM optical transceiver of claim 1 wherein the electro-optic modulator array comprises a monolithic component flip-chip mounted on the third integrated chip supporting the PIM.

13. The integrated WDM optical transceiver of claim 1 wherein the broadband light source comprises one or more optical fiber amplifiers configured to generate amplified spontaneous emission (ASE) as the input multiwavelength light beam.

14. The integrated WDM optical transceiver of claim 1 wherein the light source comprises a laser comb source generating a plurality of separate frequency components.

* * * * *